United States Patent
Dole (10) Patent No.: US 6,473,981 B2
(45) Date of Patent: Nov. 5, 2002

(54) DIAMETER INDICATOR FOR USE WITH GROOVE FORMING TOOLS

(75) Inventor: Douglas R. Dole, Whitehouse Station, NJ (US)

(73) Assignee: Victaulic Company of America, Easton, PA (US)

(*) Notice: Subject to any disclaimer, the term of this patent is extended or adjusted under 35 U.S.C. 154(b) by 24 days.

(21) Appl. No.: 09/782,417

(22) Filed: Feb. 13, 2001

(65) Prior Publication Data

US 2002/0112359 A1 Aug. 22, 2002

(51) Int. Cl.⁷ ................................................ G01B 5/08
(52) U.S. Cl. ...................... 33/555.3; 33/529; 33/555.1; 72/31.01
(58) Field of Search .......................... 33/201, 529, 549, 33/555.1, 555.3; 72/31.01, 31.06, 102, 105, 370.21

(56) References Cited

U.S. PATENT DOCUMENTS

| | | | |
|---|---|---|---|
| 1,295,614 A | 2/1919 | Scrimgeour | |
| 1,610,193 A | * 12/1926 | Battle | ........................... 33/529 |
| 2,236,443 A | * 3/1941 | Oboler | ....................... 33/555.3 |
| 2,572,999 A | * 10/1951 | Elliott | ........................ 33/555.3 |
| 2,659,982 A | * 11/1953 | Jakobi | ........................ 33/555.3 |
| 3,541,826 A | 11/1970 | Halliburton | |
| 3,563,077 A | 2/1971 | Backe et al. | |
| 3,673,832 A | * 7/1972 | Bedker et al. | ............. 72/31.01 |
| 3,903,722 A | 9/1975 | Thau, Jr. et al. | |
| 3,995,466 A | 12/1976 | Kunsman | |
| 4,160,329 A | * 7/1979 | Scrimshaw | ................. 33/555.1 |
| 4,336,703 A | * 6/1982 | Thomas | ........................ 72/102 |
| 4,454,739 A | 6/1984 | Ciccorelli | |
| 5,450,738 A | 9/1995 | Chatterley et al. | |
| 5,528,919 A | 6/1996 | McGrady et al. | |
| 5,778,715 A | 7/1998 | Lippka et al. | |
| 6,164,106 A | * 12/2000 | Nghiem et al. | ............ 72/31.01 |

* cited by examiner

Primary Examiner—G. Bradley Bennett
(74) Attorney, Agent, or Firm—Synnestvedt & Lechner LLP (57) ABSTRACT

A tool and a method for indicating that a circumferential groove of a desired outer diameter has been formed in a pipe are disclosed. The tool has an arm pivotally mountable adjacent to the pipe for rotation about a pivot axis substantially parallel to the pipe's longitudinal axis. The pipe and the arm are relatively rotatable to one another about the longitudinal axis, the arm being biased toward the pipe. A feeler surface, engageable with the outer surface of the pipe within the groove, is mounted on the arm. The geometry of the arm and the position of the feeler surface is such that the arm moves to a predetermined angular position when the diameter of the groove reaches a desired value. The feeler surface is variably positionable along the arm to accommodate pipes or grooves of various diameters.

38 Claims, 10 Drawing Sheets

DIAMETER INDICATOR FOR USE WITH GROOVE FORMING TOOLS

FIELD OF THE INVENTION

This invention concerns a tool and a method for indicating when an external circumferential groove formed in a pipe has a desired outer diameter.

BACKGROUND OF THE INVENTION

Mechanical pipe coupling systems which do not require welding, brazing or soldering for joining piping, find widespread use throughout industry, especially in petroleum and chemical applications where it may be hazardous and/or forbidden to use an open flame or an electrical arc. Such mechanical coupling systems are also more conveniently employable in the field or in remote locations where primitive environmental conditions and a lack of access to available services and supplies such as electricity or acetylene gas and oxygen inhibit traditional arc or gas welding techniques.

Figure 1:
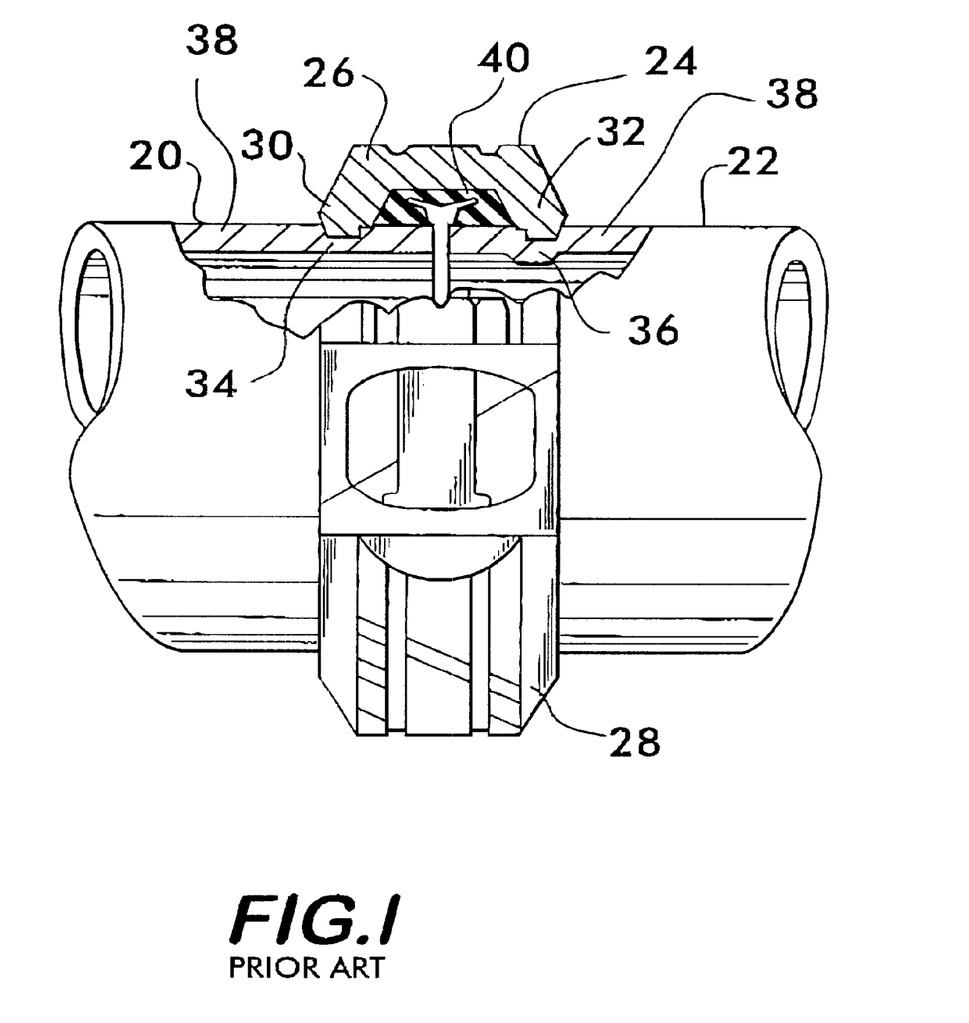
FIG. 1 is a partial sectional side view of a pipe coupling using rolled grooves to effect a joint.

FIG. 1 shows an example of one mechanical pipe coupling system wherein pipe ends 20 and 22 are joined together by a coupling 24. Coupling 24 comprises segmented semi-circular collar segments 26 and 28 which are clamped together around the pipe ends. Each collar segment is roughly U-shaped in cross section as shown, the ends of the "U" forming a pair of flanges 30 and 32 which engage grooves 34 and 36 formed circumferentially in the pipe wall 38 on each pipe end. A pressure energized elastomeric seal 40 is positioned within the coupling to effect a fluid tight joint between the pipe ends.

In addition to providing a fluid tight joint, the mechanical coupling system shown in FIG. 1 also provides a strong connection between the pipe ends which allows the joint to withstand bending, axial and torsional loads on the pipes without joint separation or blowout.

To ensure a fluid tight and robust connection via the mechanical system, fairly tight tolerances must be maintained between the flanges 30 and 32 of the collar segments 26 and 28 and the grooves 34 and 36 in the pipe ends 20 and 22. Groove depth uniformity is also an important parameter affecting the connection. While the tolerances of the flanges are relatively easily controlled during manufacture of the collar segments, it is more difficult to control the outer diameter of the grooves, as well as the uniformity of the groove depth to within a desired tolerance. There are several factors which affect the accuracy of the grooves, such as the tolerance on the pipe outer diameter, the tolerance on the wall thickness and, for pipes having an outer diameter greater than 6 inches, the roundness of the pipe is also significant.

Groove 34 is formed by a cutting process which removes material from the pipe wall 38. This may be done, for example, on a lathe. The pipe is held in the lathe chuck and rotated about its longitudinal axis while a cutting tool engages the surface at the appropriate distance from the end of the pipe and cuts the wall 38 to the desired depth to form the groove 34 having a desired outer diameter appropriate for the particular pipe and coupling 24. Although lathes produce an accurate outer groove diameter, the groove often has non-uniform depth around the pipe circumference due to the inherent out of roundness of the pipe.

In contrast, groove 36 is formed by cold working the material comprising the pipe wall 38 beyond the yield point. Such grooves are most advantageously formed in the pipes by means of a grooving tool 21, shown in FIGS. 1A and 1B. Grooving tool 21 comprises a grooving roll 23 which cooperates with a backup roll 25 to permanently deform the pipe wall 38. The pipe wall is positioned between the grooving and backup rolls, and the rolls are forced toward each other while they are rotated around the pipe, either by rotating the tool 21 relatively to the pipe 20 or the pipe relatively to the tool. The grooving roll 23 has a hardened circumferential surface 27 which engages and permanently deforms the pipe wall 38 into a trough 29 positioned circumferentially around the backup roll 25 and in registration with the grooving roll 23. As the rolls rotate around the circumference of the pipe and pressure is applied to force them together, the groove 36 is deepened, making the outer diameter of the groove smaller. A hydraulic system may be used to force the grooving roll toward the backup roll, but other means, such as a manually turned jackscrew 31, are also feasible.

Figure 1A:
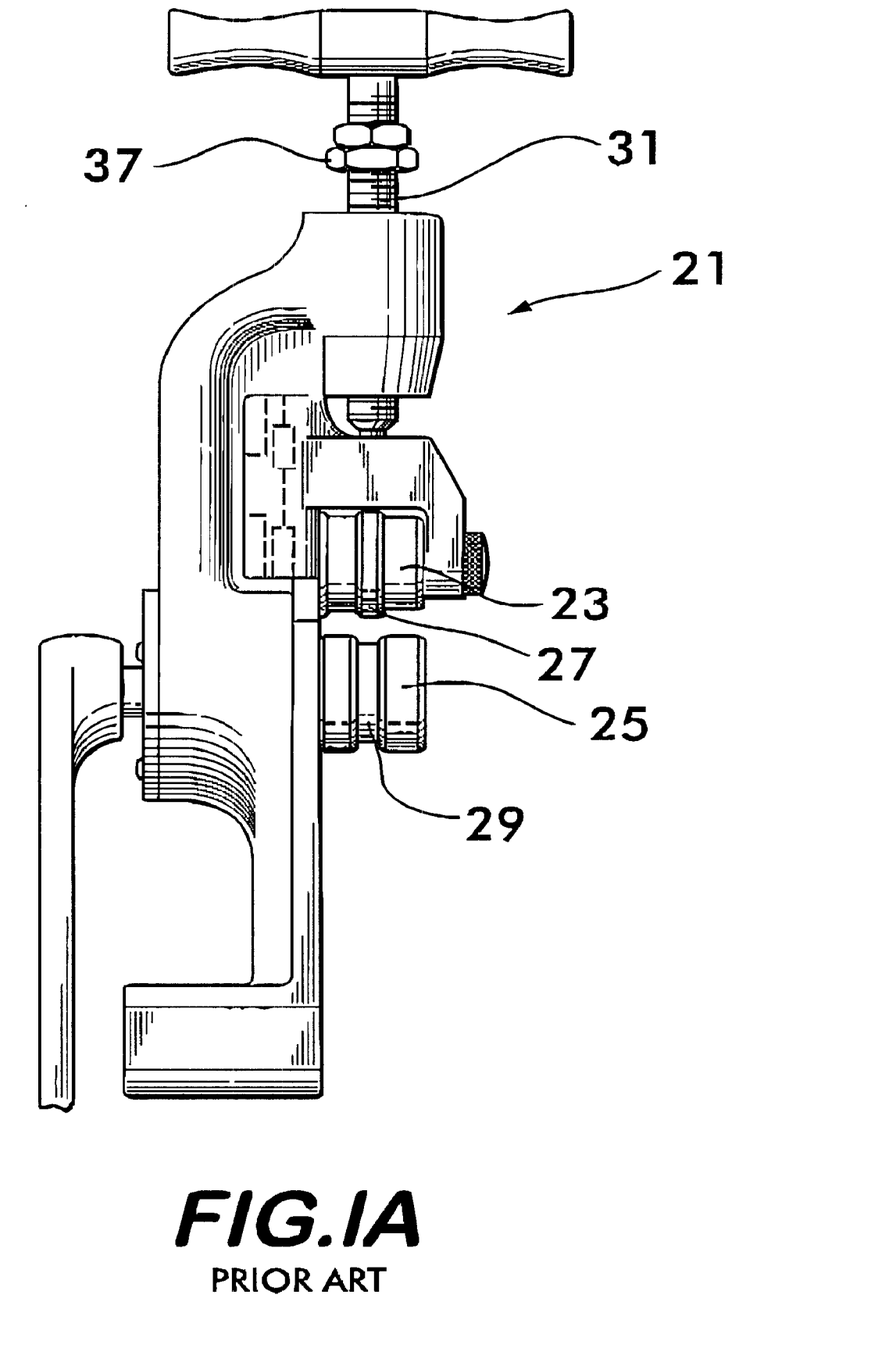
FIG. 1A is an elevational view of a prior art pipe grooving tool.
Figure 1B:
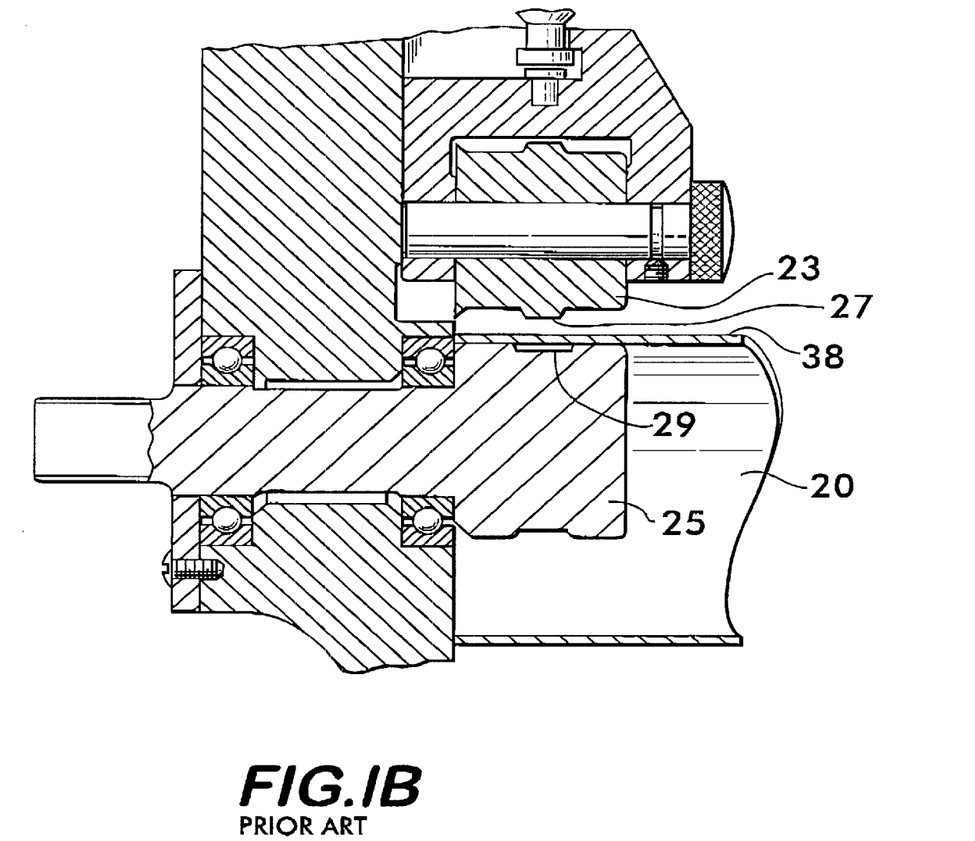
FIG. 1B is a partial cross sectional view of the prior art pipe grooving tool shown in FIG. 1A.

While the cold working process produces a groove of uniform depth, establishing the proper diameter of the groove 36 is usually a trial and error process. A variably adjustable depth gage 37 on the grooving tool 21 which limits the travel of the grooving roll toward the backup roll is used initially to form the groove 36 to a depth yielding a groove diameter near to, but short of, the desired diameter. The groove is then made progressively deeper in stages, and multiple hand measurements of the groove circumference or diameter are made between the stages until the groove is formed having a diameter within the allowable tolerance. However, this requires that the pipe being grooved must be removed and remounted on the tool between each stage, leading to significant inefficiencies in the formation of the grooves. These inefficiencies become especially costly when large numbers of pipes are required. Furthermore, the method using depth gages and hand measurements is prone to human error, leading to pipes in which the grooves are made too deep or too shallow. Grooves which are too deep allow the coupling 24 to reposition itself eccentrically on the pipe ends 20 and 22 when the pipe joint experiences bending loads. The coupling tends to move toward the side of the joint which is in tension, thus, reducing the engagement of flanges 30 and 32 on that side. This weakens the joint and may lead to joint separation. Conversely, grooves which are too shallow do not allow the coupling 24 to fully close around the pipe ends 20 and 22. Consequently, flanges 30 and 32 have less engagement with the side walls of the grooves 34 and 36. This reduces the load carrying capability of the joint which may also lead to joint separation, particularly blowout type failures. The seal 40 is also under less radial compression and is, therefore, more prone to leakage when the grooves are too shallow.

There is clearly a need for a more precise method and apparatus for forming grooves in pipe ends which avoids the time consuming trial and error procedure of multiple stages of alternating deformation and measurement and allows the grooves to be formed in one attempt efficiently, reliably and precisely at the proper diameter within the desired tolerances.

SUMMARY AND OBJECTS OF THE INVENTION

The invention concerns a tool for indicating that an external circumferential groove of a desired outer diameter has been formed in a pipe, for example, by cutting or cold forming. The pipe has an external surface into which the groove is cut or cold formed and a longitudinal axis arranged lengthwise along the pipe. In its preferred embodiment, the tool comprises a first arm pivotally mountable adjacent to the pipe for rotation about a pivot axis substantially parallel to the longitudinal axis. The pipe and the first arm are relatively rotatable to one another about the longitudinal axis. For example, for a cut groove the pipe may be mounted in the chuck of a lathe and the arm may be fixedly mounted on the lathe, the pipe turning relatively to the arm. For a cold formed groove, the arm may be mounted on a grooving tool which orbits around the pipe to form the groove.

A first feeler surface is mounted on the first arm and is engageable with the external surface of the pipe within the circumferential groove. The first feeler surface traverses the pipe circumference within the groove upon relative rotation of the pipe and the first arm. The first arm is pivotable to a predetermined angular position when the first feeler surface is engaged with the external surface of the pipe within the groove and the groove has the desired outer diameter.

The invention also concerns a tool for forming an external circumferential groove of a desired outer diameter in the wall of a pipe. The tool has a grooving roll rotatable about a first axis. The grooving roll has a circumferential surface which is engageable with the external surface of the pipe. The tool also has a backup roll rotatable about a second axis preferably located parallel with and in spaced relation to the first axis. The backup roll has a circumferential surface engageable with the internal surface of the pipe opposite the grooving roll. A circumferential trough is preferably positioned in registration with the grooving roll around the backup roll.

The tool also has means for rotating the pipe and the grooving and backup rolls relatively to one another to move the grooving roll and the backup roll circumferentially around the pipe. Preferably, the moving means comprises an electric motor which turns the backup roll. The backup roll in turn rotates the pipe and causes the pipe wall to move between the backup roll and the grooving roll.

Also included are means for moving the grooving roll and the backup roll relatively toward one another for yieldably deforming the wall between the circumferential surface of the grooving roll and the trough in the backup roll. The grooving roll and the backup roll cooperate to form the external circumferential groove in the wall upon relative motion between the pipe and the rolls circumferentially around the pipe.

The tool has an arm used to indicate when a groove of the desired diameter has been formed in the pipe. To accomplish this, the arm is pivotally mounted for rotation about a third axis parallel to and preferably coincident with the first axis. A feeler surface engageable with the external surface of the pipe within the circumferential groove is positioned on the arm. The arm is pivotable to a predetermined angular position relative to an arbitrary reference when the feeler surface is engaged with the external surface of the pipe within the groove and the groove has the desired outer diameter. The arbitrary reference may be, for example, an imaginary line passing between the first and second axes. The position of the feeler surface may be located at a predetermined distance from the circumferential surface of the grooving roll such that the predetermined angular position of the arm positions the feeler surface at a point on the pipe diametrically opposite to the grooving roll when the external circumferential groove is at the desired outer diameter.

The tool may have a second arm similarly pivotally mounted, the second arm also having a feeler surface. When two arms are present, they each have an indicator tang positioned distally to their pivot axes. The tangs face one another and are movable toward each other by moving the arms toward the pipe to place the feeler gages in contact with the external surface within the groove. The indicator tangs are in contact with one another when the external circumferential groove is at the desired outer diameter and the feeler surfaces are in contact with the external surface of the pipe within the groove.

Preferably, the tool is adaptable to form grooves in pipes of various diameters. This is accomplished by providing a plurality of predetermined positions along the arm or arms where the feeler surfaces may be mounted, each position being used in conjunction with a pipe having a particular diameter to form a groove having the outer diameter appropriate for the particular pipe.

The invention also includes a method of forming a circumferential groove of a desired outer diameter in the wall of a pipe. The method comprises the steps of providing the tool as described above and positioning the wall of the pipe between the grooving roll and the backup roll with the grooving roll engaging the external surface and the backup roll engaging the internal surface of the pipe. The grooving roll and the backup roll are rotated circumferentially around the pipe and the grooving roll and the backup roll are moved relatively toward one another to yieldably deform the wall between the rolls to form the groove. The arm is pivoted to bring the feeler surface into engagement with the external surface of the pipe within the groove. When the arm is at the predetermined angular position, the groove is at its desired diameter and the motion of the grooving roll and the backup roll toward each other is ceased. The pipe is then removed from the tool.

It is an object of the invention to provide a tool which can indicate when an external circumferential groove of a desired outer diameter has been formed in a pipe.

It is another object of the invention to provide a tool for forming grooves which eliminates the need for hand measurements of the groove diameter.

It is still another object of the invention to provide a tool which can form a groove in a pipe in one attempt without the need to repeatedly mount and remove the pipe from the tool.

It is again another object of the invention to provide a tool which can indicate when an external circumferential groove of a desired outer diameter has been formed in a pipe, the tool being adaptable to form grooves of various desired diameters in pipes of various sizes and wall thicknesses.

These and other objects and advantages of the invention will become apparent from a consideration of the following drawings and detailed description of the preferred embodiments.

DETAILED DESCRIPTION OF THE PREFERRED EMBODIMENTS

Figure 2:
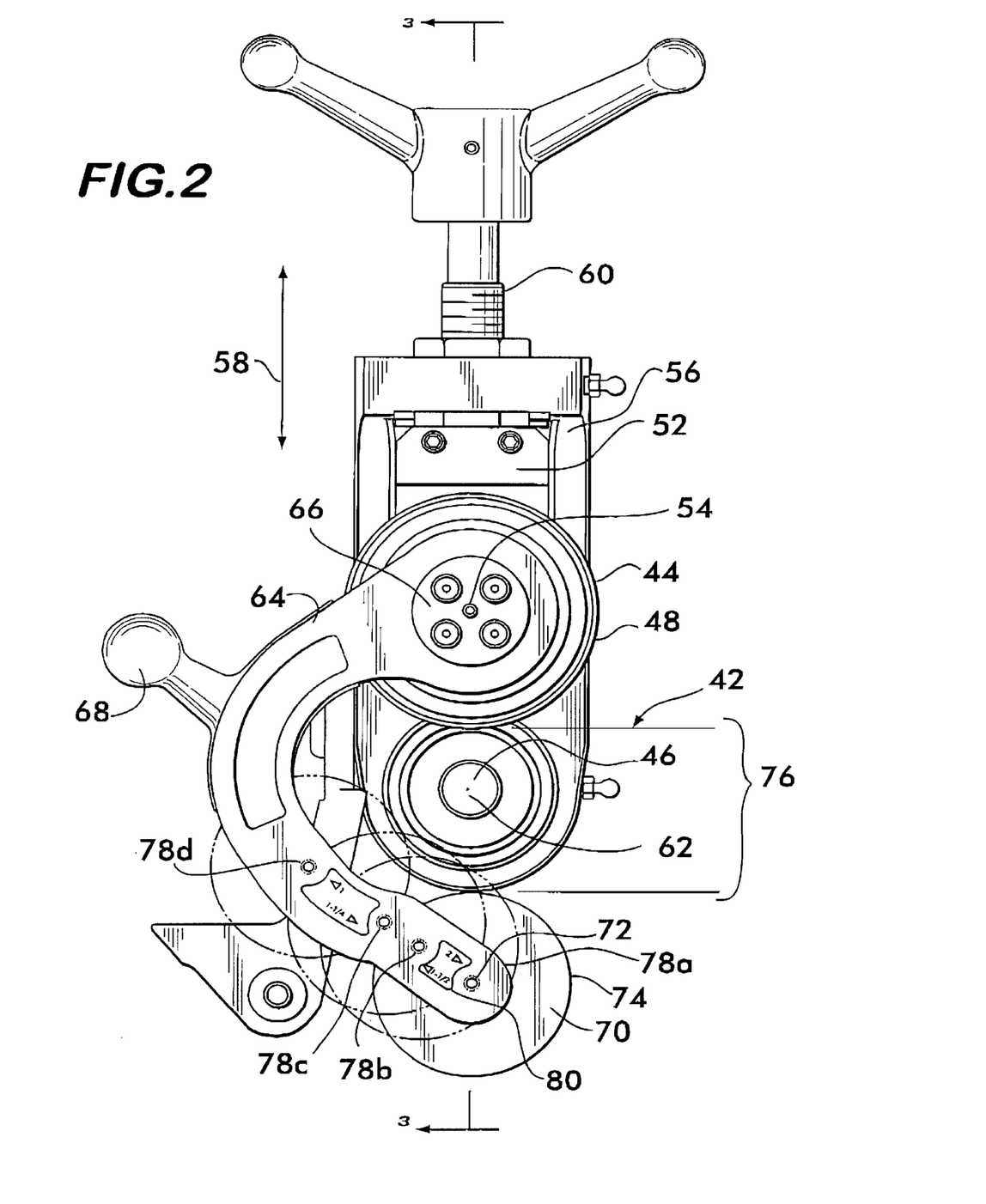
FIG. 2 is a front view of a pipe grooving tool according to the invention.
Figures 3, 4:
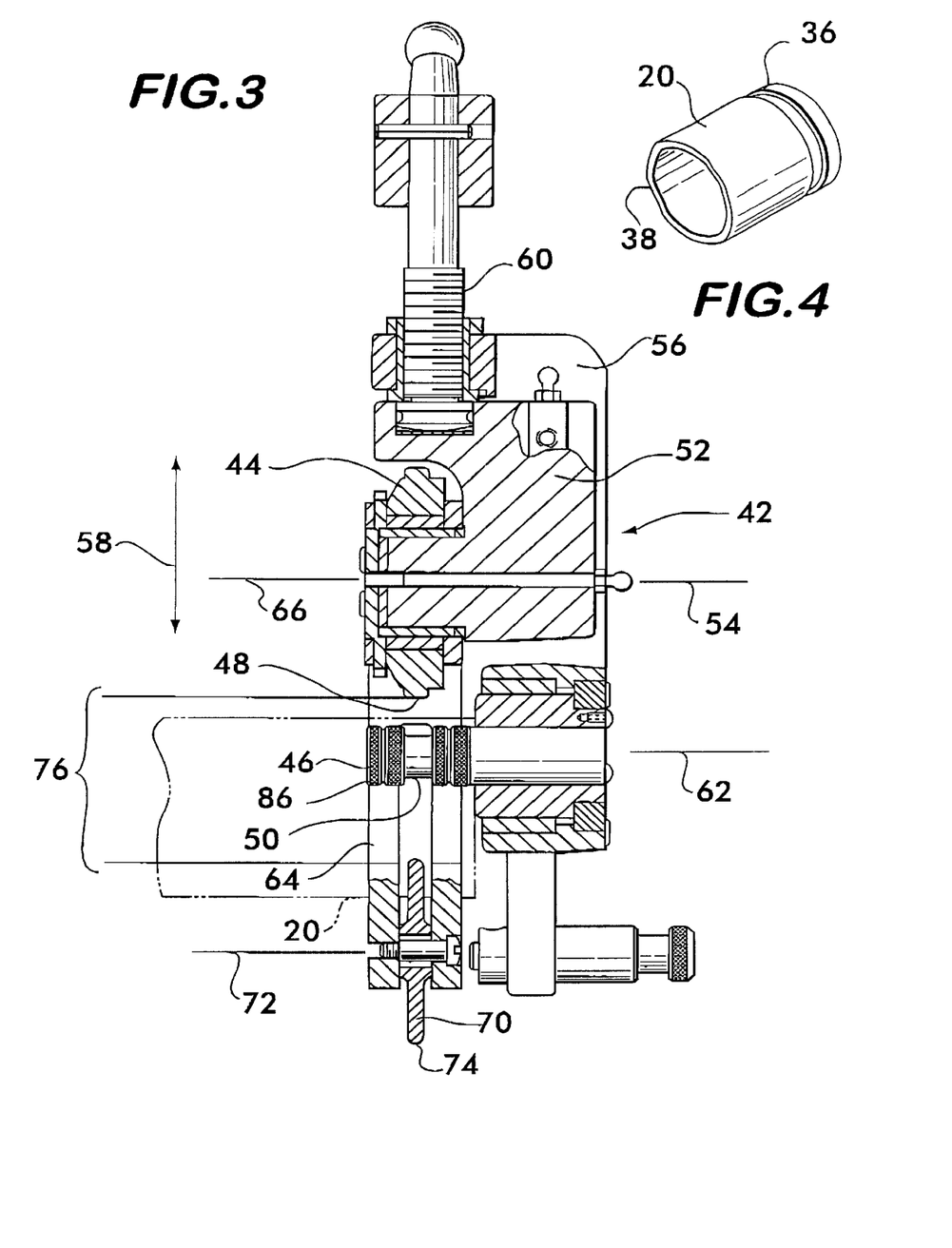
FIG. 3 is a cross-sectional view of the pipe grooving tool taken along line 3—3 of FIG. 1.
FIG. 4 is a perspective view of a pipe end having a groove formed according to the invention.

FIGS. 2 and 3 show a pipe grooving tool 42 according to the invention, the tool 42 comprising a grooving roll 44 mounted on a slidably movable jaw 52 for rotation about an axis 54 fixed to the jaw. Jaw 52 slides within a housing 56 and is movable in the direction shown by arrow 58 relatively to the housing by a moving means such as jack screw 60. Other moving means, such as hydraulic or pneumatic actuators, are also feasible to effect motion of the jaw 52.

Tool 42 also has a backup roll 46 which is mounted in a fixed location on housing 56 for rotation about another axis 62, substantially parallel to axis 54. Preferably, tool 42 also includes a means, such as an electric motor (not shown), for rotating the backup roll 46 about axis 62. Other rotating means are also feasible, such as a hand crank. Alternatively, the pipe may be rotated by a motor relatively to the grooving and backup rolls, which remain stationary relatively to the pipe. Other embodiments include driving the grooving roll or driving both the grooving roll and backup roll. (Similarly for pipe with cut grooves, the cutting tool may be moved relatively to the pipe or the pipe relatively to the cutting tool.)

Grooving roll 44 has a hardened circumferential surface 48 and is aligned in registration with a trough 50 in the backup roll 46. Motion of jaw 52 in the direction of arrow 58 moves grooving roll 44 toward and away from backup roll 46 for forming the grooves such as 36 in pipe wall 38 of pipe end 20 as seen in FIG. 4 and described below.

Tool 42 also has an arm 64 pivotally mounted on jaw 52. Arm 64 is pivotally mounted for rotation about another axis 66 substantially parallel to axes 54 and 62 and preferably coincident with axis 54. Arm 64 has a handle 68 which allows the arm to be manually pivoted about axis 66. A detent mechanism (not shown) allows the arm to be held in a pivoted position away from the backup roll 46 to facilitate pipe insertion and withdrawal between the grooving and backup rolls.

A wheel 70 is mounted on arm 64 distally from the pivot axis 66. Wheel 70 is preferably mounted for rotation about an axis 72 substantially parallel to axis 54 and has a circumferential feeler surface 74 which is engageable with the groove 36 (see FIG. 4) as described below. Feeler surface 74 is positionable at a predetermined distance 76 from the grooving roll circumferential surface 48, the predetermined distance being proportional to a desired diameter of the groove 36 enabling a particular diameter pipe 20 to be effectively engaged by the flange 30 of a coupling 24 to effect a fluid-tight pipe joint resistant to separation. Distance 76 is not necessarily exactly equal to the diameter formed in the pipe by cold working due to the inherent elasticity of the material forming the pipe, the grooving roll and the backup roll, as well as other factors such as the flexibility of the axles upon which the various components are mounted. All of these factors affect the relationship between the distance 76 and the groove diameter and contribute to the phenomenon of "spring-back", whereby, despite being yieldably cold formed, the material in the pipe within the groove retains a degree of residual elasticity and expands back to a slightly larger diameter after the grooving roll has formed the groove. For cold worked grooves the spring-back effect is taken into account in establishing distance 76 for a particular pipe diameter and groove depth. For cut grooves, the spring-back effect is negligible and the distance 76 may be exactly the desired diameter for the groove.

Preferably, wheel 70 is variably positionable at a plurality of locations such as 78a, 78b, 78c, 78d along arm 64, thereby allowing feeler surface 74 to be positioned at various distances from the grooving roll circumferential surface 48, thus, enabling the grooving tool 42 to form grooves of the required diameter in pipes of different diameters, as described below, or analogously, or grooves of differing diameters in the same diameter pipe.

Grooving Tool Operation

FIGS. 5–8 and 12 illustrate use of the grooving tool 42 in the method according to the invention to form a groove 36 in a pipe end 20 by deforming the pipe wall 38 as shown in FIG. 4. The example provided below is for a groove in a standard 2 inch pipe, it being understood that the tool is useable with pipe of any size made of a permanently deformable material such as steel, copper, brass, plastic and the like.

Tool 42 is first configured for the size of pipe to be grooved, in this example, a standard 2 inch steel pipe which has a basic outer diameter of 2.375 inches. To configure the tool, wheel 70 is mounted at position 78a. This position establishes the distance 76 between feeler surface 74 and grooving roll circumferential surface 48 equal to about 2.24 inches, the diameter of the groove 36 within tolerance for a standard 2 inch pipe. The operator is aided in configuring the tool by visual indices 80 located on arm 64 which identify the positions as being appropriate for a particular standard pipe.

Figures 5, 6, 7, 8:
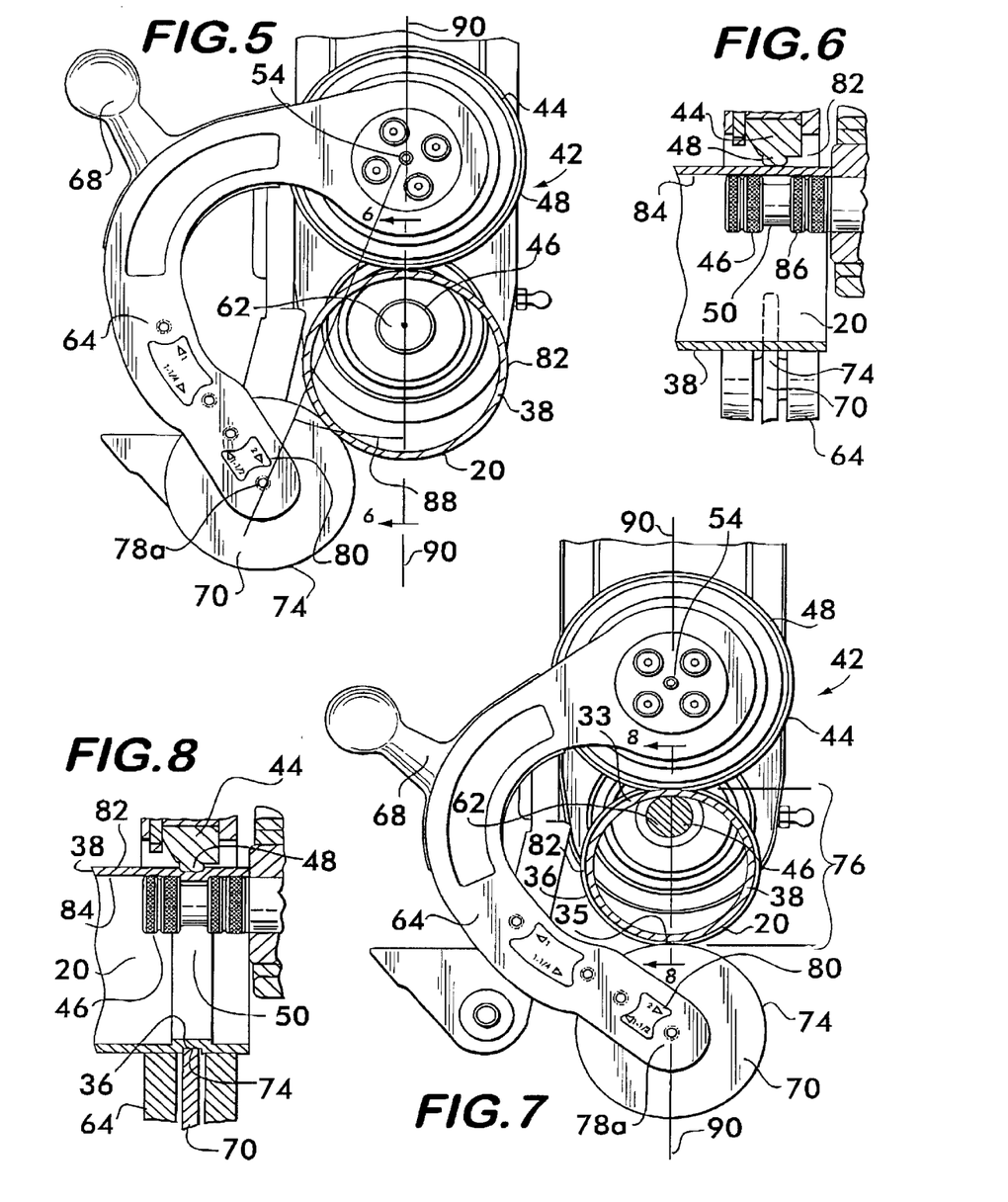
FIG. 5 is a partial view of the grooving tool of FIG. 1 forming a groove in a pipe end.
FIG. 6 is a cross-sectional view taken along line 6—6 of FIG. 5.
FIG. 7 is a partial view of the grooving tool of FIG. 1 forming a groove in a pipe end.
FIG. 8 is a cross-sectional view taken along line 8—8 of FIG. 7.

With wheel 70 in the proper location, the operator pivots arm 64 clockwise to move the wheel to one side of the tool 42. The holding detent mentioned previously (but not shown) is engaged to hold the arm in the pivoted position. Next, as shown in FIG. 6, the pipe end 20 is positioned between grooving roll 44 and backup roll 46. Using jack screw 60, the grooving roll's circumferential surface 48 is forced into engagement with the outer surface 82 of pipe wall 38, while the inner surface 84 of the pipe wall is engaged and supported by backup roll 46. Arm 64 is then manually released from its detent and pivots counterclockwise until feeler surface 74 on wheel 70 engages the outer surface 82 of pipe wall 38 as shown in FIG. 5.

The grooving roll 44 and backup roll 46 are then rotated around the circumference of pipe 20. In the preferred embodiment, this is done by actuating the aforementioned rotating means for backup roll 46. This causes pipe end 20 to rotate relatively to the grooving and backup rolls. Backup roll 46 preferably has a knurled surface 86 enabling it to securely grip and rotate the pipe end. As the pipe end rotates relatively to the rolls, the operator advances jack screw 60, forcing the grooving roll 44 toward the backup roll 46. The hardened circumferential surface 48 indents and deforms the outer surface 82 of pipe wall 38, forming the groove 36. As shown in FIG. 8, the grooving roll 44 is in registration with trough 50, thus, the pipe wall 38 is forced into the trough which acts as a die and cooperates with the surface 48 to ensure that a groove is formed having the desired width.

As further shown in FIG. 8, wheel 70 is also in registration with trough 50. As the pipe end 20 is rotated and the grooving roll 44 is advanced toward the backup roll 46, the depth of groove 36 is increased and wheel 70 rides deeper and deeper in the groove. Arm 64 begins in the position shown in FIG. 5, where wheel 70 is angularly displaced through an angle 88 from an imaginary line 90 drawn through axes 54 and 62. As the groove gets deeper, the arm pivots under the influence of gravity in a counter clockwise direction, reducing the angle 88. Eventually the arm 64 moves to the position shown in FIG. 7, where angle 88 is zero. In this position, grooving roll 44 engages the outer surface 82 of pipe 20 at a first point of contact 33. The center of wheel 70 is in alignment with line 90 and a point on its circumference comprising feeler surface 74 engages the outer surface 82 at a second point of contact 35 on the pipe 20 positioned diametrically opposite to the first point of contact 33. When the wheel 70 is in the position, shown in FIG. 7, and the feeler surface 74 is in contact with the outer surface 82 of pipe 20 (within groove 36), then the diameter of the groove 36 is equal to the distance 76 between the feeler surface 74 and the circumferential surface 48 of grooving roll 44. Recall that this distance is the desired distance of 2.24 inches within the tolerance for a 2 inch pipe as established by locating the wheel 70 at position 78a during configuration of the tool.

When the arm is in the position shown in FIG. 7, it provides a visual signal to the operator that the groove has the desired outer diameter. However, to provide a more readily apparent visual indication that the desired groove diameter has been formed, it is preferred to allow the arm to fall substantially past the diametrically opposite position. This is done by angularly orienting the grooving tool 42 so that gravity pulls the arm 64 towards, the pipe 20. Alternately, the arm may be spring-biased against the pipe. The visual indicator may also be accompanied by an audible sound as the arm contacts the pipe.

Upon indication that the groove having the appropriate diameter has been formed, the operator should cease advancing the grooving roll toward the backup roll. The operator allows the pipe to continue turning, however, to ensure that the groove 36 has the desired diameter over the entire circumference of the pipe. The arm 64 is then manually pivoted clockwise via handle 68 to engage its holding detent, the jack screw 60 is used to move the grooving roll 44 out of groove 36 and away from backup roll 46 and the pipe is then removed from tool 42. The groove 36 has been formed efficiently and reliably, in one attempt without the need for trial and error.

While a preferred and practical example of the operation of the tool has been presented, it is understood that minor variations in the components and operation of the tool 42 would work as well. For example, rather than relying on gravity, arm 64 may be spring biased to move in the counterclockwise direction to keep the feeler surface 74 in contact with the outer surface 82 of pipe 20. As noted above, the jack screw 60 could be replaced by an automatic actuator, run by hydraulics or pneumatics. Instead of turning backup roll 46 to rotate the pipe 20, the grooving roll 44 or the pipe 20 itself could be rotated. The tool 42 could also work if the grooving roll were fixed with respect to the housing 56 and the backup roll were mounted on a movable jaw.

Furthermore, it is not necessary that the arm indicate the desired diameter for the groove 36 when the angle 88 is zero. The relative geometry of the wheel 70, arm 64, and grooving roll 44 may be established such that the angle 88 have some predetermined value other than zero which indicates that the desired diameter has been reached. For simplicity of operation however, it is preferred that the predetermined angle which indicates that the desired diameter has been reached be the same for all pipe diameters on which the tool may be used.

Figure 9:
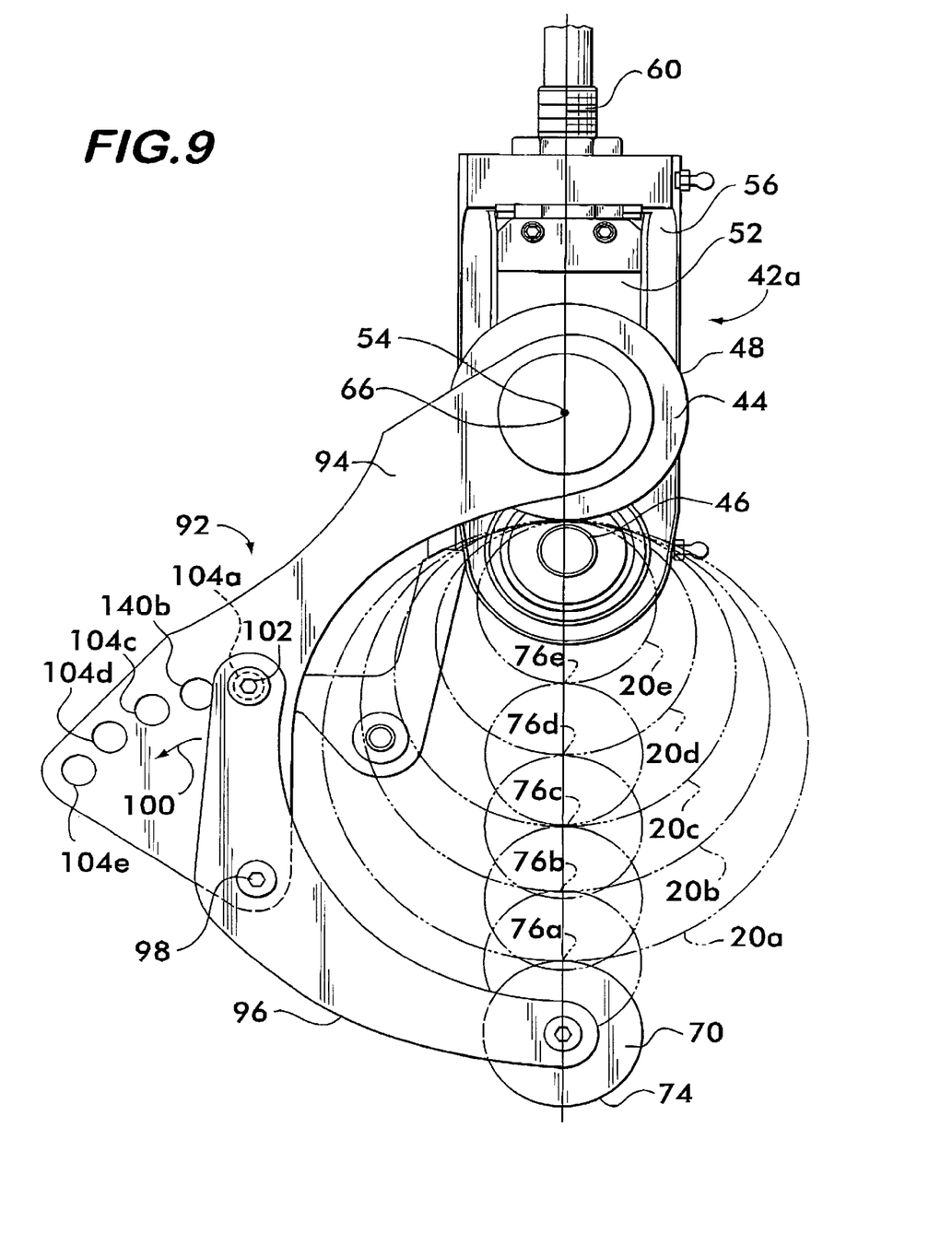
FIG. 9 is a front view of an alternate embodiment of the pipe grooving tool according to the invention.

FIG. 9 shows an alternate embodiment of the grooving tool 42a, substantially identical to tool 42, but having an arm 92. Arm 92 comprises a first arm portion 94 pivotally mounted to jaw 52 for rotation about axis 66 and a second arm portion 96 pivotally mounted to the end of the first arm portion for rotation about an axis 98 as shown by arrow 100, axis 98 being substantially parallel to axes 54 and 66. Wheel 70, having the circumferential feeler surface 74, is mounted in a fixed location at the end of the second arm portion. To configure tool 42a to form a groove in a pipe of a particular diameter, the second arm portion 96 is pivoted relatively to the first arm portion until the feeler surface 74 is at the desired distance 76 from the grooving roll circumferential surface 48 proportional to the appropriate groove diameter for the particular pipe to be grooved. For convenience of operation, different distances 76a–76e for various standard pipes 20a–20e are readily selectable by fixing second arm portion 96 in a predetermined angular position relatively to the first arm portion 94 by means of pin 102 and holes 104a–104e. When engaged by pin 102, each hole 104a–104e positions the feeler surface 74 at an appropriate respective distance 76a76e from the grooving roll circumferential surface 48 to indicate formation of a groove of the appropriate diameter in a particular pipe 20a20e having a particular diameter.

Figure 10:
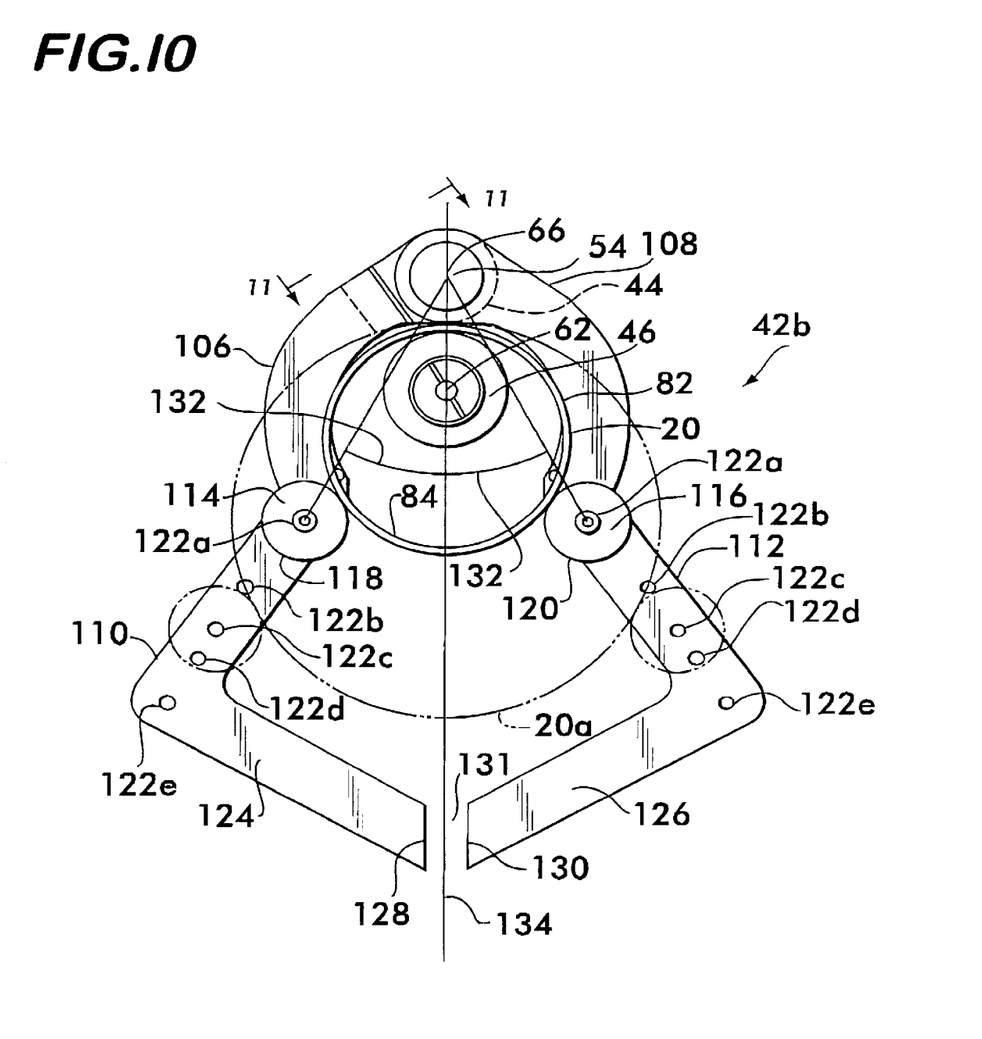
FIG. 10 is a front view of another alternate embodiment of the pipe grooving tool according to the invention forming a groove in a pipe end.
Figure 11:
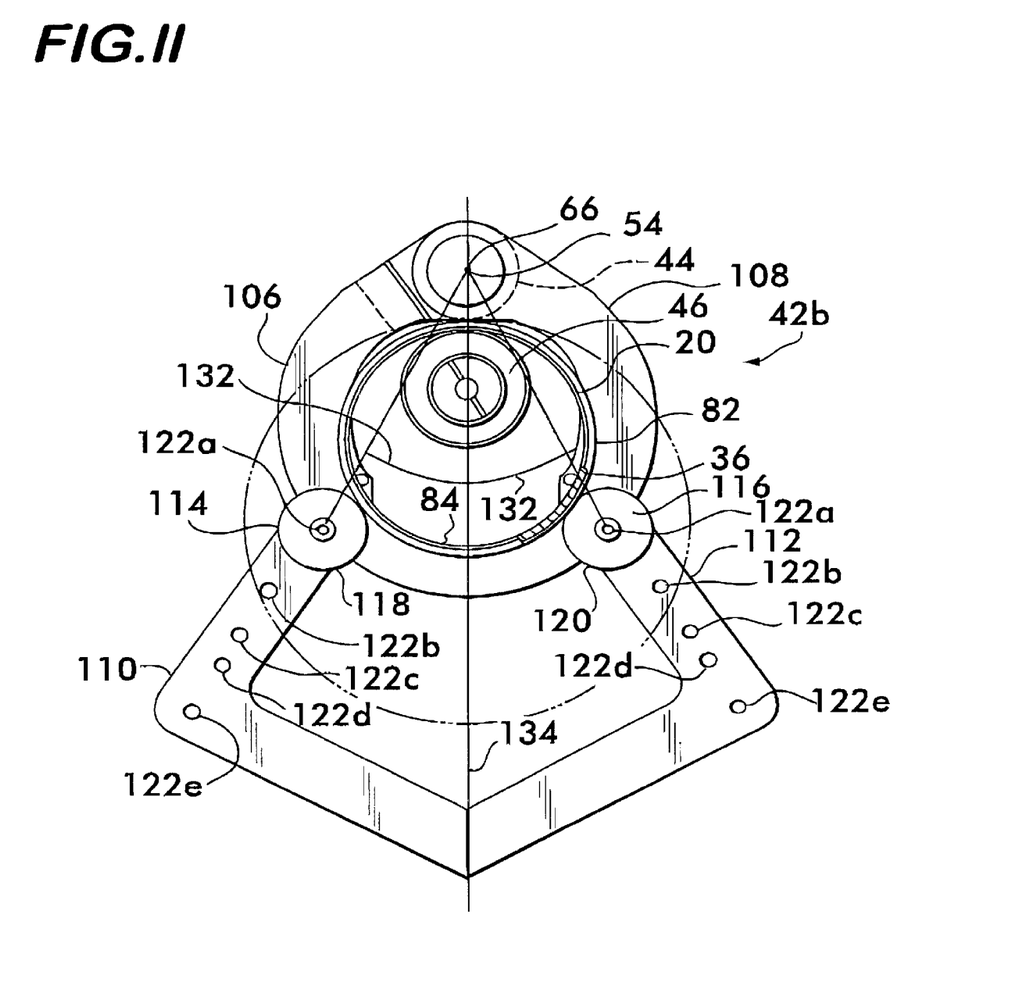
FIG. 11 is a front view of the pipe grooving tool shown in FIG. 10 forming a groove in a pipe end.
Figure 12:
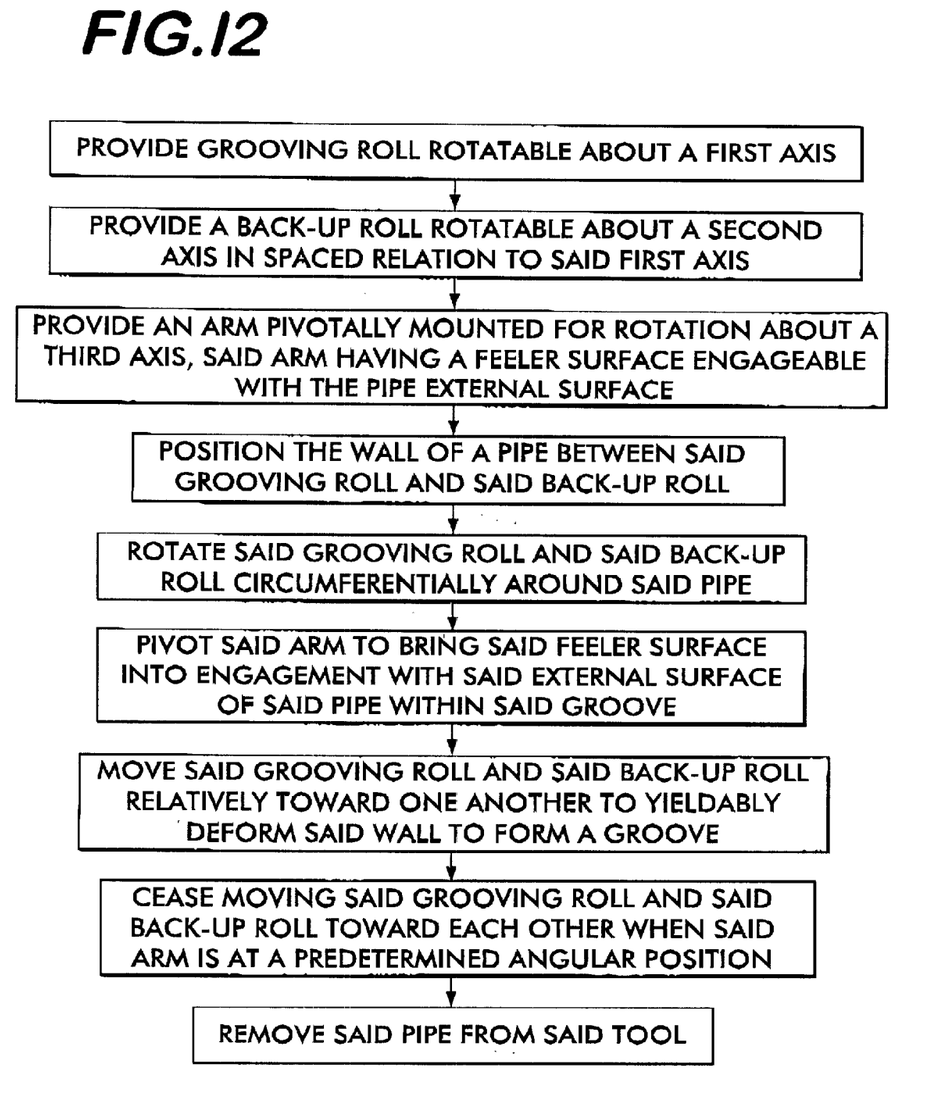
FIG. 12 is a flow chart describing the steps of a method for forming a groove having a desired outer diameter in the wall of a pipe.

FIGS. 10 and 11 show yet another embodiment of the grooving tool 42b according to the invention. Tool 42b has first and second arms 106 and 108 which are pivotally mounted to a movable jaw (not shown) for rotation about axis 66 which is preferably coincident with axis 54 about which grooving roll 44 rotates. Arms 106 and 108 each have respective first portions 110 and 112 on which are mounted wheels 114 and 116 having circumferential feeler surfaces 118 and 120. Wheels 114 and 116 may be positioned at any one of a number of predetermined positions 122a–122e along first portions 110 and 112. The positions 122a–122e are used for different standard pipes as described below.

Each arm 106 and 108 also has a respective indicator tang 124 and 126 projecting from an arm. The tangs have ends 128 and 130 which face one another and indicate when a groove of the desired diameter has been formed in a pipe as described below.

As with the other embodiments, in operation, tool 42b is first configured for the particular standard pipe 20 to be grooved. The tool is configured by mounting wheels 114 and 116 at the appropriate position 122a–122e along arms 106 and 108. FIG. 10 shows the tool 42b configured for a particular pipe 20 with the wheels at positions 122a as shown in solid line. If a larger diameter pipe, for example, 20a (shown in broken line) was to be grooved then different positions, for example 122c, would be used to mount wheels 114 and 116.

Once configured, the arms are separated from one another and the pipe end 20 is positioned between grooving roll 44 and backup roll 46 as described above. The grooving roll is engaged with the pipe outer surface 82, the pipe inner surface 84 engages the backup roll, and the arms 106 and 108 are allowed to pivot toward one another, the wheels 114 and 116 contacting the pipe outer surface 82 as shown in FIG. 10. Note that the tang ends 128 and 130 are facing one another but separated by a gap 131.

As the pipe end 20 is rotated and the grooving roll 44 is advanced toward the backup roll by a means previously described, a groove 36 is formed in the pipe end (see FIG. 11). Wheels 114 and 116 ride in the groove 36 and as the groove is made deeper by advance of the grooving roll arms 106 and 108 pivot toward each other under the influence of gravity. The geometrical relationships of the grooving roll 44, the pipe 20, the wheels 114 and 116 and their position 122a on the arms 106 and 108 are such that when the groove 36 is at the desired diameter appropriate to pipe 20 and the feeler surfaces 118 and 120 are in contact with the pipe outer surface 82, the ends 128 and 130 of the indicator tangs 124 and 126 are in contact, closing gap 131. This condition, illustrated in FIG. 11, indicates to an operator to cease advancing grooving roll 44 toward backup roll 46, although the pipe is allowed to continue turning to ensure that the proper diameter is achieved for the entire circumference of groove 36. In general, the angular position 132 of the arms relative to some reference line, such as the axis 134 passing through axes 54 and 62, is used to indicate when the proper diameter of the groove has been reached.

As described above for other embodiments, the arms 106 and 108 need not rely on gravity to move them toward each other as groove 36 gets deeper. The arms may be spring biased to force them together. Furthermore, this embodiment may be readily modified to automate the grooving process. For example, grooving roll 44 could be advanced automatically under the command of a microprocessor, thus, forming the groove 36 in pipe 20. Tang ends 128 and 130 coming together could be used to generate a signal by means of a microswitch or a proximity sensor to send a feedback signal to the microprocessor indicating that the desired diameter has been reached and the grooving roll should no longer be advanced toward the backup roll.

It is understood that the preceding description used a cold formed groove in a pipe to describe the invention by way of example only, and that the invention is equally adaptable for use in forming cut grooves, such as by pivotally mounting the arm on a lathe, orbital groove cutter or other machine used to cut the groove into the pipe.

Furthermore, the invention is not limited to the formation of grooves in pipes but may also be effective at indicating that a desired diameter has been achieved over an extended length of any cylindrical body, such as in the formation of a section of reduced diameter along the length of solid bar stock.

The tool and the method of indicating that a circumferential groove of a desired outer diameter has been formed in the wall of a pipe allows such grooves to be formed rapidly, precisely and with great efficiency. The invention eliminates the trial and error method requiring multiple steps alternating between forming the groove and measuring the groove diameter. The invention eliminates a potential source of error in that no measurements or calculations need be performed by a human operator. This should result in less wastage and greater efficiency in the construction of pipe joints in piping networks.

What is claimed is:

1. A tool for indicating that an external circumferential groove of a desired outer diameter has been formed in a pipe having an external surface and a longitudinal axis, said tool comprising:

a first arm pivotally mountable adjacent to said pipe for rotation about a pivot axis substantially parallel to said longitudinal axis, said pipe and said first arm being relatively rotatable to one another about said longitudinal axis; and a first feeler surface mounted on said first arm and engageable with said external surface of said pipe within said circumferential groove, said first feeler surface traversing said pipe circumference within said groove upon relative rotation of said pipe and said first arm, said first arm being pivotable to a predetermined angular position when said first feeler surface is engaged with said external surface of said pipe within said groove and said groove has said desired outer diameter.

2. A tool according to claim 1, wherein said first arm is biased toward said pipe to facilitate engagement of said first feeler surface with said external surface of said pipe.

3. A tool according to claim 1, further comprising a plurality of positions arranged along said first arm, said feeler surface being locatable at any one of said positions for adapting said tool to indicate the formation of said groove of said desired outer diameter in pipes having different outer diameters, each of said positions being useable for a pipe of a particular diameter.

4. A tool according to claim 3, wherein said predetermined angular position of said first arm is the same for each different diameter pipe when said groove has said desired outer diameter.

5. A tool according to claim 1, further comprising a plurality of positions arranged along said first arm, said feeler surface being locatable at any one of said positions for adapting said tool to indicate the formation of circumferential grooves of various diameters in a pipe having a particular diameter, each of said positions corresponding to a groove of a different predetermined outer diameter.

6. A tool according to claim 5, wherein said predetermined angular position of said first arm is the same for each different diameter groove when said groove has said desired outer diameter.

7. A tool according to claim 1, further comprising a wheel mounted on said first arm for rotation about an axis substantially parallel to said longitudinal axis, said wheel having a circumference which comprises said feeler surface.

8. A tool according to claim 1, wherein said first arm comprises:

a first arm portion pivotally mounted for rotation about said pivot axis;

a second arm portion pivotally mounted on said first arm portion for rotation about a second axis substantially parallel to said pivot axis, said feeler surface being positioned on said second arm portion; and means for fixing said second arm portion at a predetermined angle relatively to said first arm portion for adapting said tool to indicate the formation of said groove of said desired outer diameter in pipes having different outer diameters, each of said predetermined angles being useable for a pipe of a particular diameter.

9. A tool according to claim 1, further comprising:

a second arm pivotally mountable adjacent to said pipe for rotation about said pivot axis, said pipe being positionable between said first and second arms, said second arm having a second feeler surface engageable with said external surface of said pipe within said circumferential groove;

a first indicator tang mounted on said first arm distally of said pivot axis; and a second indicator tang mounted on said second arm distally of said pivot axis and facing said first indicator tang, said indicator tangs being movable toward each other by pivoting said arms toward said pipe to place said feeler surfaces in contact with said external surface within said groove, said indicator tangs being in contact with one another when said feeler surfaces are in contact with said external surface within said groove and said external circumferential groove is at said desired outer diameter.

10. A tool according to claim 9, wherein said arms are biased toward said pipe to facilitate engagement of said feeler surfaces with said external surface of said pipe.

11. A tool according to claim 9, further comprising a plurality of positions arranged along each of said arms, said feeler surfaces each being locatable at any one of said positions for adapting said tool to indicate the formation of said groove of said desired outer diameter in pipes having different outer diameters, each of said positions being useable for a pipe of a particular diameter.

12. A tool for forming an external circumferential groove of a desired outer diameter in the wall of a pipe having an internal and an external surface, said tool comprising:

a grooving roll rotatable about a first axis, said grooving roll having a circumferential surface engageable with the external surface of said pipe;

a backup roll rotatable about a second axis, said backup roll having a circumferential surface engageable with the internal surface of said pipe opposite said grooving roll;

means for rotating said pipe and said grooving and backup rolls relatively to one another to move said grooving roll and said backup roll circumferentially around said pipe;

means for moving said grooving roll and said backup roll relatively toward one another for yieldably deforming said wall with said circumferential surface of said grooving roll to form said external circumferential groove in said wall upon relative motion between said pipe and said rolls circumferentially around said pipe; and an arm pivotally mounted for rotation about a third axis substantially parallel to said first axis, said arm having a feeler surface engageable with said external surface of said pipe within said circumferential groove, said arm being pivotable to a predetermined angular position when said feeler surface is engaged with said external surface of said pipe within said groove and said groove has said desired outer diameter.

13. A tool according to claim 12, wherein said third axis is coincident with said first axis.

14. A tool according to claim 12, wherein said predetermined angular position of said arm places said feeler surface at a point on said pipe diametrically opposite to said grooving roll.

15. A tool according to claim 12, wherein said arm is biased toward said pipe to facilitate engagement of said feeler surface with said external surface of said pipe.

16. A tool according to claim 15, wherein said arm is biased by gravity.

17. A tool according to claim 12, further comprising a plurality of positions arranged along said arm, said feeler surface being locatable at any one of said positions for adapting said tool to form said groove in pipes of different diameters, each of said positions being useable for a pipe of a particular diameter.

18. A tool according to claim 17, wherein said predetermined angular position of said arm is the same for each different diameter pipe when said groove has said desired outer diameter.

19. A tool according to claim 12, further comprising a wheel mounted on said arm for rotation about a fourth axis substantially parallel to said first axis, said wheel having a circumference which comprises said feeler surface.

20. A tool according to claim 19, further comprising a plurality of positions arranged along said arm, said wheel being rotatably mountable at any one of said positions for adapting said tool to form said grooves in pipes of different diameters, each of said positions being useable for a pipe of a particular diameter.

21. A tool according to claim 20, wherein said predetermined angular position of said arm is the same for each different diameter pipe when said groove has said desired outer diameter.

22. A tool for forming an external circumferential groove of a desired outer diameter in the wall of a pipe having an internal and an external surface, said tool comprising:

a grooving roll rotatable about a first axis, said grooving roll having a circumferential surface engageable with the external surface of said pipe at a first point of contact for forming said circumferential groove therein;

a backup roll rotatable about a second axis parallel and in spaced relation to said first axis, said backup roll having a circumferential surface engageable with the internal surface of said pipe opposite said grooving roll, said backup roll having a circumferential trough positioned in registration with said grooving roll;

means for rotating said pipe and said grooving and backup rolls relatively to one another to move said grooving roll and said backup roll circumferentially around said pipe;

means for moving said grooving roll and said backup roll relatively toward one another for yieldably forming said external circumferential groove in said wall between said grooving roll and said backup roll upon relative motion between said pipe and said rolls circumferentially around said pipe; and an arm pivotally mounted for rotation about a third axis substantially parallel to said first axis, said arm having a feeler surface located at a predetermined distance from said circumferential surface of said grooving roll, said predetermined distance being proportional to said desired outer diameter of said groove, said arm being pivotable to position said feeler surface in contact with said external surface of said pipe within said groove at a second point of contact on said pipe diametrically opposite to said first point of contact when said external circumferential groove is at said desired outer diameter.

23. A tool according to claim 22, wherein said predetermined distance is equal to said desired outer diameter of said groove.

24. A tool according to claim 22, wherein said third axis is positioned coaxially with said first axis.

25. A tool according to claim 22, wherein said feeler surface is variably positionable at a plurality of predetermined distances from said circumferential surface of said grooving roll adapting said tool for use with a plurality of different diameter pipes, said feeler surface being positionable at said second point of contact for any of said different pipe diameters when said groove has said desired outer diameter.

26. A tool according to claim 25, wherein said arm has a plurality of predetermined locations arranged lengthwise thereon, said feeler surface being positionable at any one of said locations to position said feeler surface at one of said plurality of distances for a particular pipe diameter.

27. A tool according to claim 26, further comprising a wheel mountable on said arm at any of said predetermined locations, said wheel being rotatable about a fourth axis substantially parallel to said first axis, the circumference of said wheel comprising said feeler surface.

28. A tool according to claim 22, wherein said arm comprises:

a first arm portion pivotally mounted for rotation about said first axis;

a second arm portion pivotally mounted on said first arm portion for rotation about a fourth axis parallel to said first axis, said feeler surface being positioned on said second arm; and means for fixing said second arm portion at a predetermined pivot angle relatively to said first arm portion, said pivot angle determining said predetermined distance between said feeler surface and said circumferential surface of said grooving roll.

29. A tool according to claim 28, further comprising a wheel mounted on said second arm portion for rotation about a fifth axis substantially parallel to said first axis, said wheel having a circumferential surface forming said feeler surface.

30. A tool for forming an external circumferential groove of a desired outer diameter in the wall of a pipe having an internal and an external surface, said tool comprising:

a grooving roll rotatable about a first axis, said grooving roll having a circumferential surface engageable with the external surface of said pipe for forming said circumferential groove therein;

a backup roll rotatable about a second axis parallel and in spaced relation to said first axis, said backup roll having a perimetral surface engageable with the internal surface of said pipe opposite said grooving roll, said perimetral surface having a circumferential trough positioned in registration with said grooving roll;

means for rotating said pipe and said grooving and backup rolls relatively to one another to move said grooving roll and said backup roll circumferentially around said pipe;

means for moving said grooving roll and said backup roll relatively toward one another for yieldably forming said external circumferential groove in said wall between said grooving roll and said backup roll upon relative motion between said pipe and said rolls circumferentially around said pipe;

a first arm pivotally mounted for rotation about a third axis substantially parallel to said first axis, said first arm having a first feeler surface engageable with said external surface of said pipe within said circumferential groove;

a second arm pivotally mounted for rotation about a fourth axis substantially parallel to said first axis, said second arm having a second feeler surface engageable with said external surface of said pipe within said circumferential groove;

a first indicator tang mounted on said first arm distally of said third axis; and a second indicator tang mounted on said second arm distally of said fourth axis and facing said first indicator tang, said indicator tangs being movable toward each other by pivoting said arms toward said pipe to place said feeler surfaces in contact with said external surface within said groove, said indicator tangs positioned so as to be in contact with one another when said external circumferential groove is at said desired outer diameter.

31. A tool according to claim 30, wherein said third and fourth axes are positioned coaxially with said first axis.

32. A tool according to claim 30, wherein each of said arms has a plurality of predetermined locations arranged lengthwise thereon, said first and second feeler surfaces being positionable at any one of said locations on said first and second arms respectively to adapt said tool for use with a plurality of different diameter pipes, said indicator tangs being positioned so as to contact one another when said external circumferential groove is at said desired outer diameter for each of said different diameter pipes.

33. A tool according to claim 32, further comprising first and second wheels mountable on said first and second arms respectively at any of said predetermined locations, said wheels being rotatable about respective axes parallel to said first axis, the circumferences of said first and second wheels comprising said first and second feeler surfaces, respectively.

34. An improved tool for forming an external circumferential groove of a desired outer diameter in the wall of a pipe having an internal and an external surface, the tool comprising:

a grooving roll rotatable about a first axis, said grooving roll having a circumferential surface engageable with the external surface of said pipe;

a backup roll rotatable about a second axis, said backup roll having a circumferential surface engageable with the internal surface of said pipe opposite said grooving roll;

means for rotating said pipe and said grooving and backup rolls relatively to one another to move said grooving roll and said backup roll circumferentially around said pipe;

means for moving said grooving roll and said backup roll relatively toward one another for yieldably deforming said wall with said circumferential surface of said grooving roll to form said external circumferential groove in said wall upon relative motion between said pipe and said rolls circumferentially around said pipe, wherein the improvement comprises:

an arm pivotally mounted for rotation about a third axis substantially parallel to said first axis, said arm having a feeler surface engageable with said external surface of said pipe within said circumferential groove, said arm being pivotable to a predetermined angular position when said feeler surface is engaged with said external surface of said pipe within said groove and said groove has said desired outer diameter.

35. A tool for indicating that an external circumferential region having a desired outer diameter has been formed in a cylindrical body having an external surface and a longitudinal axis, said tool comprising:

a first arm pivotally mountable adjacent to said cylindrical body for rotation about a pivot axis substantially parallel to said longitudinal axis, said cylindrical body and said first arm being relatively rotatable to one another about said longitudinal axis; and a first feeler surface mounted on said first arm and engageable with said external surface of said cylindrical body within said circumferential region, said first feeler surface traversing said cylindrical body circumference within said circumferential region upon relative rotation of said cylindrical body and said first arm, said first arm being pivotable to a predetermined angular position when said first feeler surface is engaged with said external surface of said cylindrical body within said circumferential region and said circumferential region has said desired outer diameter.

36. A tool according to claim 35, wherein said external circumferential region is a groove.

37. A tool according to claim 36, wherein said cylindrical body is a pipe.

38. A method of forming a circumferential groove of a desired outer diameter in the wall of a pipe having an internal and an external surface, said method comprising the steps of:

provind a grooving roll rotatable about a first axis, said grooving roll having a circumferential surface engageable with the external surface of said pipe;

providing a backup roll rotatable about a second axis parallel and in spaced relation to said first axis, said backup roll having a circumferential surface engageable with the internal surface of said pipe opposite said grooving roll, said backup roll having a circumferential trough positioned in registration with said grooving roll;

providing an arm pivotally mounted for rotation about a third axis parallel to said first axis, said arm having a feeler surface engageable with said external surface of said pipe within said circumferential groove, said arm being pivotable to a predetermined angular position relative to a line passing between said first and second axes when said feeler surface is engaged with said external surface of said pipe within said groove and said groove has said desired outer diameter;

positioning the wall of said pipe between said grooving roll and said backup roll, said grooving roll engaging said external surface, said backup roll engaging said internal surface;

rotating said grooving roll and said backup roll circumferentially around said pipe;

pivoting said arm to bring said feeler surface into engagement with said external surface of said pipe within said groove;

moving said grooving roll and said backup roll relatively toward one another to yieldably deform said wall between said rolls to form said groove;

ceasing to move said grooving roll and said backup roll toward each other when said arm is at said predetermined angular position; and removing said pipe from said tool.

* * * * *